(12) United States Patent
Piette et al.

(10) Patent No.: US 10,543,605 B2
(45) Date of Patent: Jan. 28, 2020

(54) CAMERA ON MOVABLE ARM

(71) Applicant: Avigilon Corporation, Vancouver (CA)

(72) Inventors: Kevin Piette, Carlisle, MA (US); Pietro Russo, Melrose, MA (US); Bo Yang Yu, Winchester, MA (US)

(73) Assignee: Avigilon Corporation, Vancouver (CA)

( * ) Notice: Subject to any disclaimer, the term of this patent is extended or adjusted under 35 U.S.C. 154(b) by 241 days.

(21) Appl. No.: 15/677,666

(22) Filed: Aug. 15, 2017

(65) Prior Publication Data

US 2019/0054640 A1 Feb. 21, 2019

(51) Int. Cl.

| B25J 19/02 | (2006.01) |
|---|---|
| B25J 18/06 | (2006.01) |
| B25J 9/16 | (2006.01) |
| B25J 18/00 | (2006.01) |
| B25J 9/00 | (2006.01) |
| H04N 7/18 | (2006.01) |

(52) U.S. Cl.
CPC ........... *B25J 19/023* (2013.01); *B25J 9/0078* (2013.01); *B25J 9/1697* (2013.01); *B25J 18/005* (2013.01); *B25J 18/06* (2013.01); *H04N 7/185* (2013.01)

(58) Field of Classification Search
CPC ...... B25J 19/023; B25J 9/0078; B25J 18/005; B25J 18/06; B25J 9/1697; H04N 7/183; H04N 7/185; G08B 13/19617
USPC ........................................................ 700/245
See application file for complete search history.

(56) References Cited

U.S. PATENT DOCUMENTS

| 6,408,224 | B1 * | 6/2002 | Okamoto | B25J 9/1661 |
| | | | | 29/721 |
| 8,224,485 | B2 * | 7/2012 | Unsworth | B25J 9/06 |
| | | | | 700/245 |
| 8,337,521 | B2 * | 12/2012 | Cooper | A61B 1/008 |
| | | | | 606/205 |
| 8,414,246 | B2 | 4/2013 | Tobey | |
| 8,571,711 | B2 * | 10/2013 | Jacobsen | B08B 9/045 |
| | | | | 180/9.21 |
| 9,149,929 | B2 * | 10/2015 | Motzer | B25J 9/162 |
| 9,566,711 | B2 * | 2/2017 | Smith | G05B 19/41815 |
| 10,300,599 | B2 * | 5/2019 | Simaan | B25J 9/1625 |
| 2006/0156851 | A1 * | 7/2006 | Jacobsen | B25J 18/06 |
| | | | | 74/490.01 |

(Continued)

OTHER PUBLICATIONS

Bionic Handling Assistant, Safe human-machine interaction; Festo Corporate; retrieved from https://www.festo.com/group/en/cms/10241.html Jun. 13, 2017; 11 pages.

(Continued)

*Primary Examiner* — Jaime Figueroa
(74) *Attorney, Agent, or Firm* — Daniel Hammond (57) ABSTRACT

An electronic movement-controlled apparatus that includes a camera and a movable arm is disclosed. The movable arm has both a stationary end and a movable end with the camera being attached to the movable end so as to be movable therewith. The stationary end is configured to be coupled to a rigid support structure. The movable arm includes a plurality of arm segments connected in series to form the movable arm. The arm segments are configured to have cooperating segment regions in terms of each of the arm segments being compressible and expandable in unison to move the movable end and effect a pan and tilt movement of the camera.

25 Claims, 12 Drawing Sheets

(56) References Cited

U.S. PATENT DOCUMENTS

| | | | | |
|---|---|---|---|---|
| 2009/0030562 | A1* | 1/2009 | Jacobsen | B08B 9/045 701/2 |
| 2009/0171151 | A1* | 7/2009 | Choset | A61B 1/00006 600/114 |
| 2011/0184241 | A1* | 7/2011 | Zubiate | A61B 1/0055 600/141 |
| 2011/0230894 | A1* | 9/2011 | Simaan | A61B 1/00183 606/130 |
| 2011/0313243 | A1* | 12/2011 | Zubiate | A61B 1/008 600/104 |
| 2013/0023859 | A1* | 1/2013 | Malkowski | A61B 17/00234 606/1 |
| 2013/0090763 | A1* | 4/2013 | Simaan | A61B 5/11 700/258 |
| 2013/0131868 | A1* | 5/2013 | Rucker | B25J 9/1625 700/262 |
| 2013/0178838 | A1* | 7/2013 | Malkowski | A61B 17/00 606/1 |
| 2014/0090506 | A1* | 4/2014 | Tobey | B25J 5/007 74/490.01 |
| 2014/0330432 | A1* | 11/2014 | Simaan | B25J 9/1633 700/250 |
| 2015/0119900 | A1* | 4/2015 | Simaan | A61B 1/00006 606/130 |
| 2017/0049298 | A1* | 2/2017 | Hunter | A61B 1/005 |
| 2017/0120442 | A1* | 5/2017 | Frei | B25J 9/06 |
| 2017/0182659 | A1* | 6/2017 | Simaan | B25J 9/1625 |
| 2018/0009109 | A1* | 1/2018 | Norton | B25J 9/1625 |

OTHER PUBLICATIONS

Bionic Handling Assistant, Festo brochure; Apr. 2012; 6 pages.
Zheng Li and Ruxu Du; "Design and Analysis of a Bio-Inspired Wire-Driven Multi-Section Flexible Robot"; International Journal of Advanced Robotic Systems; 2013; vol. 10; 11 pages.
Dong et al.; "A Novel Continuum Robot Using Twin-Pivot Compliant Joints: Design, Modeling, and Validation"; Journal of Mechanisms and Robotics; May 2016, vol. 8; 14 pages.
Schutz; "Robotic Snake-Arm Flies Into Tight Spaces"; OC Robotics Snake-Arm Robot, 2012 brochure; 4 pages.
Wire Driven Flexible Arm Robot; Institute of Precision Engineering; The Chinese University of Hong Kong; retrieved from http://www.ipe.cuhk.edu.hk/projects20.html Jun. 13, 2017; 3 pages.

* cited by examiner

CAMERA ON MOVABLE ARM

FIELD

The present subject-matter relates to a camera on a movable arm and, in particular, to a camera attached to an arm which moves under computerized control.

BACKGROUND

In common Pan-Tilt-Zoom (PTZ) camera design, a camera capable of tilt motion is positioned on a pan platform. To achieve 360 degree pan motion, a slip ring may be employed; however the slip ring may be relatively expensive and may be prone to failure. To help protect the PTZ camera, a spherical bubble may be employed; however the spherical bubble may potentially impact image quality.

Outside of the field of PTZ cameras, some efforts have been made to commercialize robotic arms with cameras attached to these arms. One example of this is the Snake-arm Robot™ sold by OC Robotics of Bristol, UK.

SUMMARY

According to one example embodiment, there is provided an electronic movement-controlled apparatus that includes a camera, an arm bending mechanism and a movable arm. The movable arm is coupled to the arm bending mechanism, and the movable arm has both a stationary end and a movable end with the camera being attached to the movable end so as to be movable therewith. The stationary end is configured to be coupled to a rigid support structure. The movable arm includes a plurality of arm segments connected in series to form the movable arm. The arm segments are configured to have cooperating segment regions in terms of each of the arm segments being compressible and expandable in unison under operation of the arm bending mechanism to move the movable end and effect a pan and tilt movement of the camera. The electronic movement-controlled apparatus also includes a controller that is configured to receive a command to change a pointing direction of the camera to a desired pointing direction. In response to the command, the controller is further configured to map the desired pointing direction to a respective requisite position of the movable end of the movable arm. The controller is further configured to cause the arm bending mechanism to bend the movable arm to effect movement of the movable end of the movable arm to the requisite position so that the camera points in the desired pointing direction.

According to another example embodiment, there is provided a method of panning and tilting a camera attached to a first end of an electronically-controlled, movable arm. The movable arm includes both the first end, which is a movable end, as well as a second end, which is a stationary end. The method includes receiving a command to change a pointing direction of the camera to a desired pointing direction. The method also includes mapping, in response to the command, the desired pointing direction to a respective requisite position of the movable end of the movable arm. The method also includes causing the movable arm to move the movable end to the requisite position so that the camera points in the desired pointing direction.

According to yet another example embodiment, there is provided a video surveillance system with addressable devices which intercommunicate over a network. The video surveillance system includes a camera, an arm bending mechanism and a computing device communicatively coupled to the camera. The computing device is configured to transmit, over the network, a command to change a pointing direction of the camera to a desired pointing direction. The video surveillance system also includes a movable arm coupled to the arm bending mechanism. The movable arm has both a stationary end and a movable end with the camera being attached to the movable end so as to be movable therewith. The stationary end is configured to be coupled to a rigid support structure. The movable arm includes a plurality of arm segments connected in series to form the movable arm, and the arm segments are configured to have cooperating segment regions in terms of each of the arm segments being compressible and expandable in unison under operation of the arm bending mechanism to move the movable end and effect a pan and tilt movement of the camera. The video surveillance system also includes a controller configured to receive the command from the computing device and, in response to the command, map the desired pointing direction to a respective requisite position of the movable end of the movable arm. The controller is further configured to cause the arm bending mechanism to bend the movable arm to effect movement of the movable end of the movable arm to the requisite position so that the camera points in the desired pointing direction.

BRIEF DESCRIPTION OF THE DRAWINGS

Reference will now be made, by way of example, to the accompanying drawings.

It will be appreciated that for simplicity and clarity of illustration, elements shown in the figures have not necessarily been drawn to scale. For example, the dimensions of some of the elements may be exaggerated relative to other elements for clarity. Furthermore, where considered appropriate, similar or the same reference numerals may be used in the figures to indicate corresponding or analogous elements.

DETAILED DESCRIPTION OF EXAMPLE EMBODIMENTS

Numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered in any way claim scope limiting, but rather as merely describing the implementation of the various example embodiments herein described.

It will be understood that when an element is herein referred to as being "connected", "in communication with" or "coupled" to another element, it can be directly connected, directly in communication with or directly coupled to the other element or intervening elements may be present. In contrast, when an element is herein referred to as being "directly connected", "directly in communication with" or "directly coupled" to another element, there are no intervening elements present. Other words used to describe the relationship between elements should be interpreted in a like fashion (i.e., "between" versus "directly between", "adjacent" versus "directly adjacent", etc.).

Figure 1:
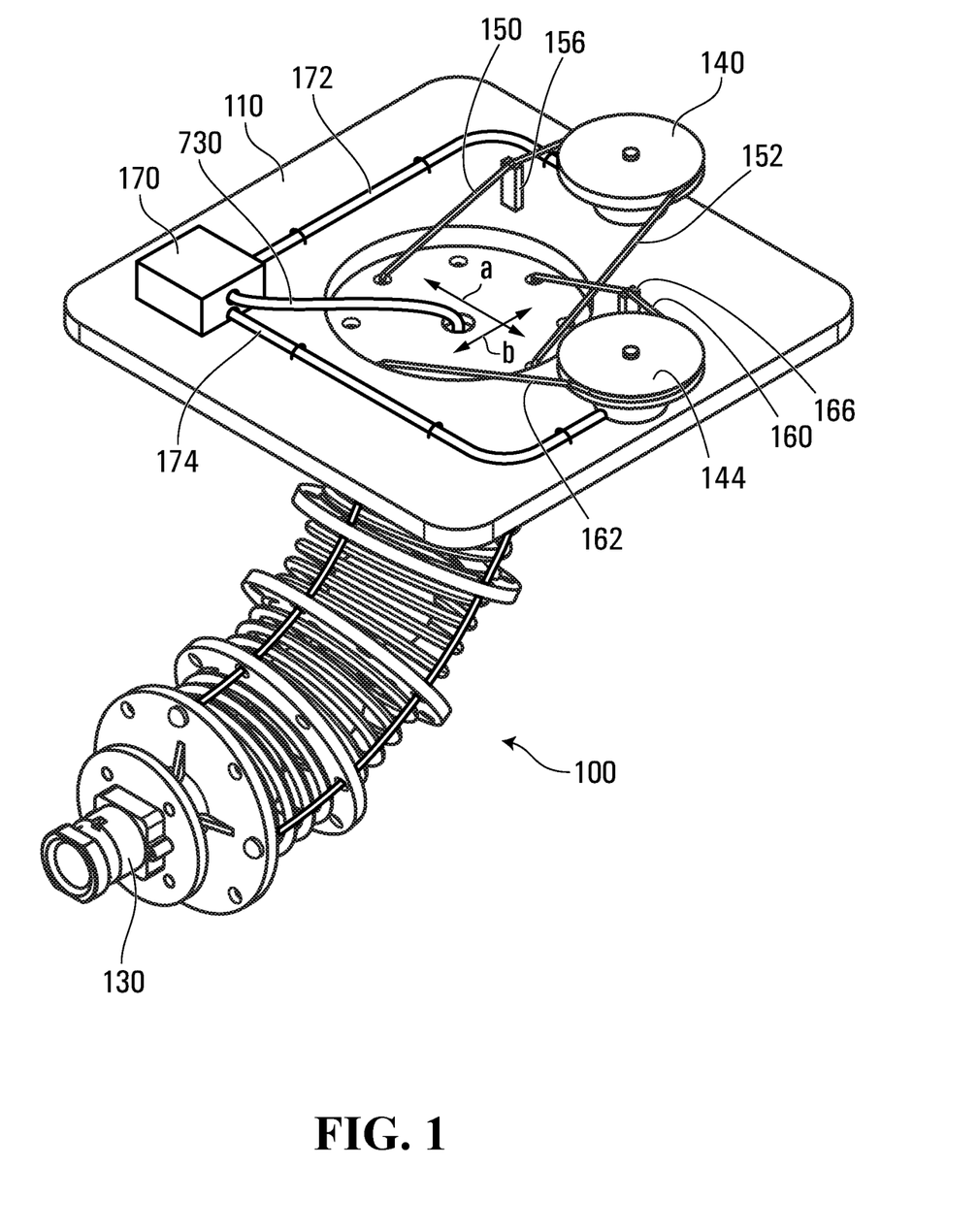
FIG. 1 illustrates a top perspective view of a movable arm in accordance with an example embodiment.

Reference is now made to FIG. 1, which illustrates a movable arm 100 in accordance with an example embodiment. In the illustrated example embodiment the movable arm 100 is attached below a panel-type structure 110 such as, for example, a ceiling tile, board jutting out of a wall, etc. Furthermore, alternative attachment arrangements are contemplated. For example, the movable arm 100 could be indirectly (i.e. not directly) attached to a ceiling via direct attachment to an enclosure that houses associated motors and electronics with the enclosure itself being attached directly to the ceiling.

Still with reference to FIG. 1, attached above the panel-type structure 110 is a first pulley and motor assembly 140 and a second pulley and motor assembly 144. A wire is retained on a track of the pulley of the first assembly 140. This wire can be seen as functionally divided into two segments 150 and 152, both of which extend down the length of the movable arm 100 on opposite sides thereof. Guide 156 helps keep the wire on the track of the pulley of the first assembly 140. The guide 156 is rigidly attached to the panel-type structure 110 and extends perpendicularly upwards from it spacing the wire above the upper surface of the panel-type structure 110. Also, the guide 156 includes a notch at the top of the guide 156 that receives the wire segment 150. Another wire is retained on the pulley of the second assembly 144. This wire can be seen as divided into two segments 160 and 162, both of which extend down the length of the movable arm 100 on opposite sides thereof. Guide 166 helps keep the wire on the track of the pulley of the second assembly 144. The guide 166 is rigidly attached to the panel-type structure 110 and extends perpendicularly upwards from it spacing the wire above the upper surface of the panel-type structure 110. Also, the guide 166 includes a notch at the top of the guide 166 that receives the wire segment 160. As will be subsequently herein explained in more detail, the arm bending mechanism of the movable arm 100 includes all of the above-mentioned pulley and motor assemblies as well as the wires.

In the illustrated example embodiment, power and control signals for the first pulley and motor assembly 140 as well as for the second pulley and motor assembly 144 are received from an electronics enclosure 170 attached on a top surface of the panel-type structure 110. In particular, power and control signals for the first pulley and motor assembly 140 are delivered via wiring 172 from the electronics enclosure 170. Thus, signals delivered to the motor of the first assembly 140 actuate and control the motor, which in turn effects controlled actuation of the pulley of the first assembly 140. Similarly, power and control signals for the second pulley and motor assembly 144 are delivered via wiring 174 from the electronics enclosure 170. Thus, signals delivered to the motor of the second assembly 144 actuate and control the motor, which in turn effects controlled actuation of the pulley of the second assembly 144.

In accordance with some example embodiments, the electronics enclosure 170 may be seen as an interface between the movable arm 100 and a larger system (such as, for example, a video surveillance system) to which the movable arm 100 belongs. Components of such a larger system may include, for example, a Video Management System (VMS) client, a VMS server, etc. which communicate with the movable arm 100 via transceiver circuitry contained in the electronics enclosure 170. Such communication may be carried out in any suitable wired or wireless manner as will be understood by those skilled in the art.

Regarding movement of the movable arm 100, any desired change of the position of the movable arm 100 is controlled by having the first and second assemblies 140 and 144 control the lengths of their respective pairs of wire segments, and since a camera 130 is attached at the movable end of the movable arm 100, any change of orientation and positioning of the camera 130 is directly linked to such controlled position change of the movable arm 100 by the first and second assemblies 140 and 144. Controlling of the lengths of segments 150 and 152 by the first assembly 140 causes motion of the movable end of the movable arm 100 in a direction as indicated by double headed arrow a. Controlling of the lengths of segments 160 and 162 by the second assembly 144 causes motion of the movable arm 100 in a direction as indicated by double headed arrow b. Up/down movement of the movable end of the movable arm 100 is also achievable by actuation of either or both of the first and second assemblies 140 and 144. In this regard, maximum shortening of either of the wire segments along either of the pulleys will cause very marked curling of the movable arm 100 with the movable end of the movable arm 100 becoming positioned at a maximum height. Conversely, equalizing a length of both the wire segments 150 and 152 as well as the wire segments 160 and 162 will cause the movable end of the movable arm 100 to become positioned at a minimum height since in such case the movable arm will become straightened out, with the length of the movable arm 100 extending downwardly and substantially perpendicular to the panel-type structure 110. In accordance with some examples, the movable arm 100 is sufficiently long and bendable to allow the camera 130 to be pointed in any direction away from the immediate vicinity of the movable arm 100.

As mentioned, the movable arm 100 has any desired change of its position controlled by mechanical operation of the first and second assemblies 140 and 144 in that they control the lengths of their respective pairs of wire segments. In this regard, it is interesting to note that the wire segments 150, 152, 160 and 162 in some respects imitate aspects of movement mechanisms found in the biological world of animals. For example, the arm of an octopus includes longitudinal muscles, each of which can change shape (expand or contract a muscle length) to effect movement of the arm of the octopus.

Figure 2:
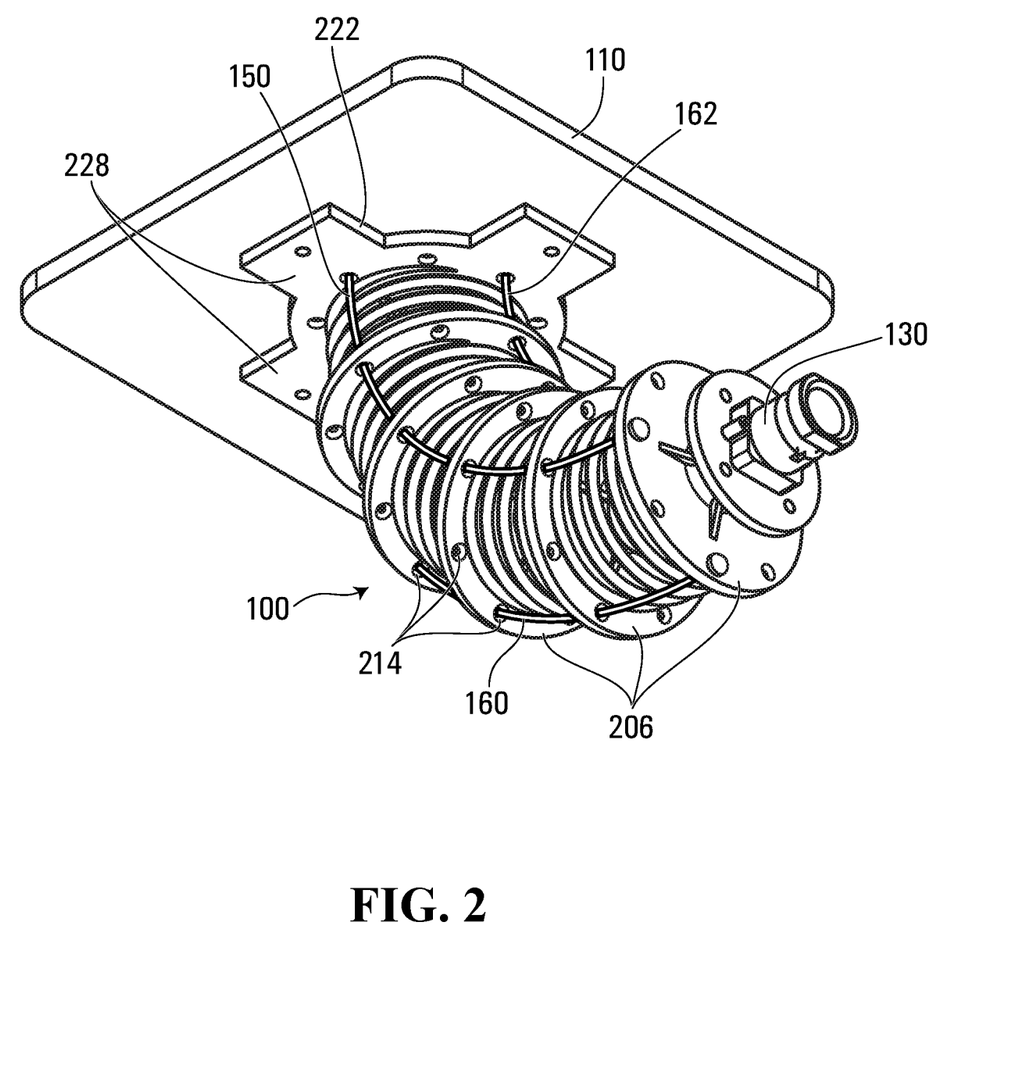
FIG. 2 illustrates a bottom perspective view of the movable arm of FIG. 1.
Figure 3:
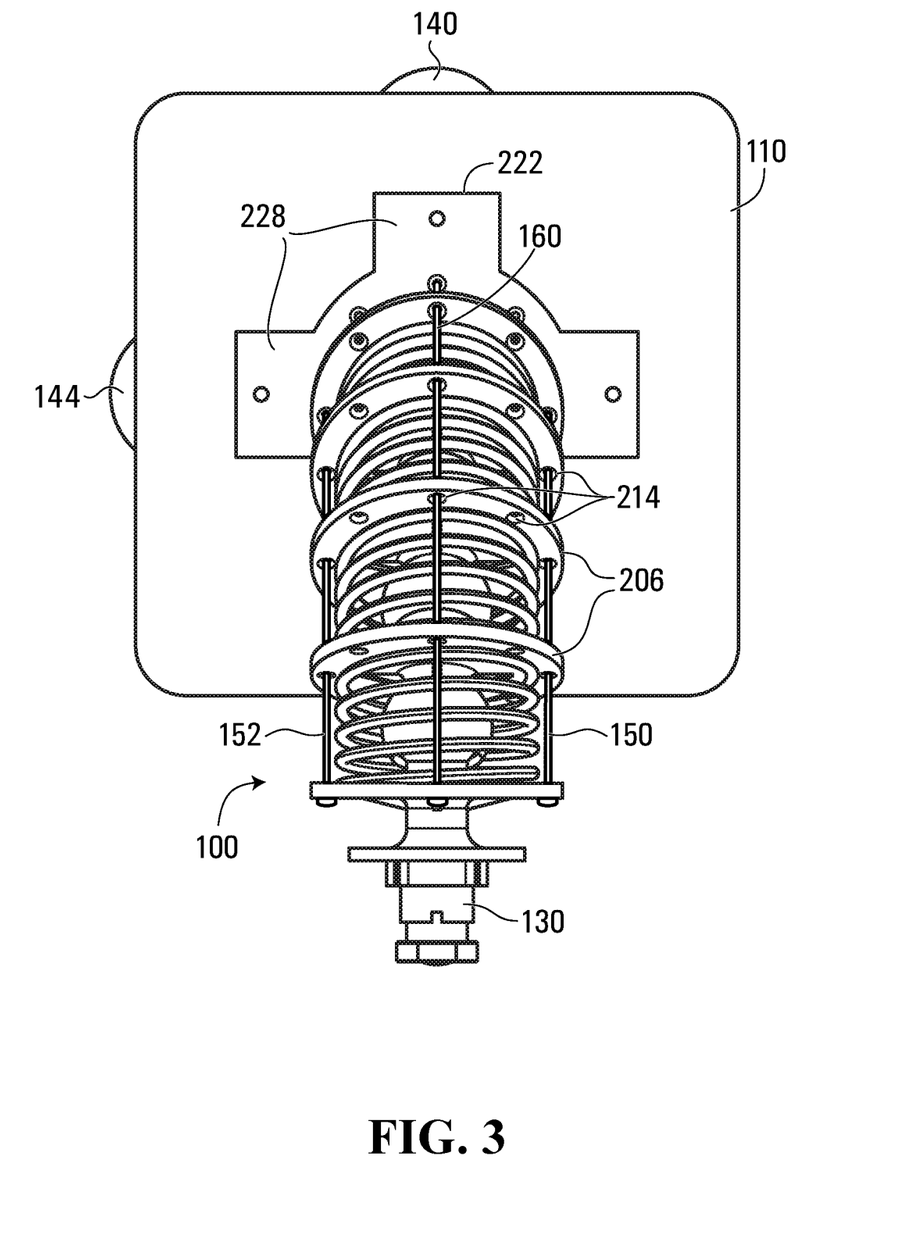
FIG. 3 illustrates a bottom view of the movable arm of FIG. 1.

FIGS. 2 and 3 illustrate a bottom perspective view and a bottom view respectively of the movable arm 100 showing additional detail of the wire segments that extend along the length of the movable arm 100. As shown, a plurality of discs 206 are at regular spaced intervals along the curved length of the movable arm 100. Each disc 206 in turn has a plurality of holes 214, some of which have one of the plurality of wire segments threaded through them, and these wire segments are able to slide within the holes in the discs 206 except for the holes where the wire segments end (i.e. attachment is at the particular disc 206 where the wire segments end). These holes 214 are positioned just in from an outer circumference (circular edge) of the disc 206 and there is even spacing between adjacent holes along the circumference, so the spacing between two adjacent holes in the illustrated example embodiment is 45 degrees. As will be appreciated by those skilled in the art, the number and spacing of the holes will vary. For example, in the illustrated example embodiment there are eight holes; however in an alternative example embodiment there may be more holes such as, for example twelve holes (in such case the spacing between two adjacent holes would be 30 degrees instead of 45 degrees). Some suitable number of holes fewer than eight is also contemplated such as, for example, four.

Still with reference to FIGS. 2 and 3, there is illustrated a disc 222 that is shaped different and larger than the other discs 206. It includes four extensions 228 (spaced 90 degrees from each other) to which a screw or the like can extend through to fix, in place against the panel-type structure 110, the disc 222 (and in turn the proximal end of the movable arm 100 as well). It will be understood that each of the discs 206 as well as the disc 222 are located at a beginning of a respective arm segment (or link) of the movable arm 100. In the illustrated example embodiment, six links are shown. Thus, the disc 222 is at the beginning of link 1, and five discs 206 are each of a beginning a respective one of links 2-6. More generally, for n discs there are n links because of the 1:1 relationship. Also, it will be understood that alternative constructions for providing a stationary end for the movable arm 100 are contemplated. For example, as an alternative to the illustrated disc 222, the movable arm could instead be fixed to a wall of a motor/electronics-housing enclosure of the type previously herein described.

Figure 4:
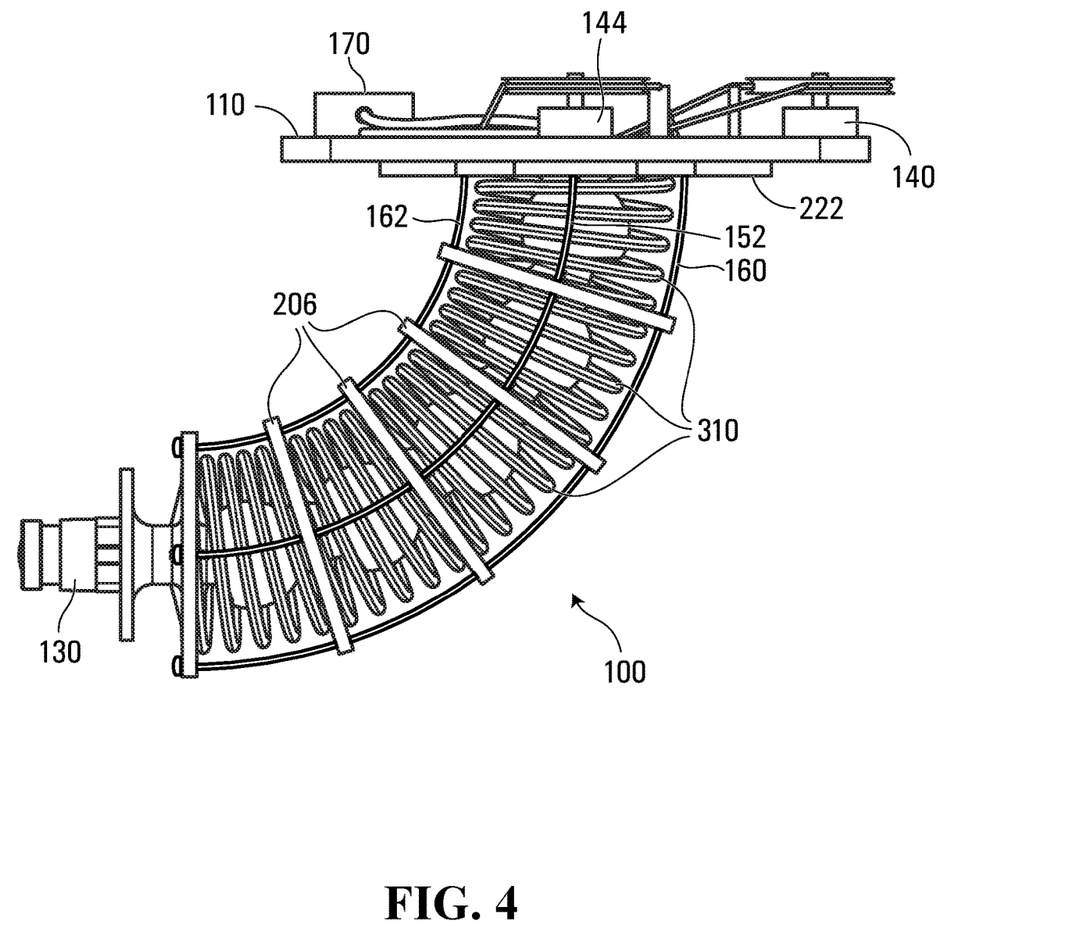
FIGS. 4 and 5 illustrate opposite side elevational views of the movable arm of FIG. 1.
Figure 5:
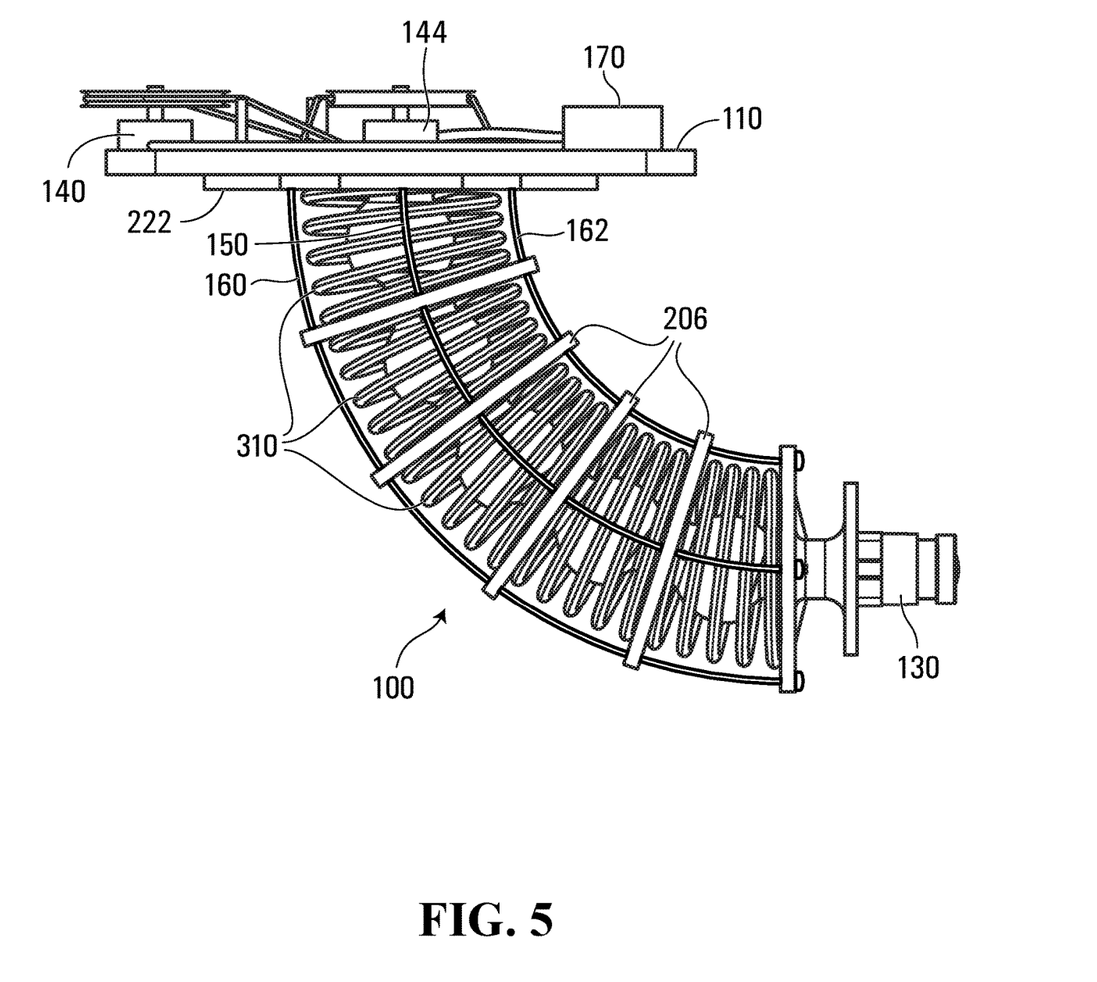

Reference will now be made to FIGS. 4 and 5 which illustrates opposite side elevational views of the movable arm 100. As illustrated in FIGS. 4 and 5, coil springs 310 are attached to the links of the movable arm 100 and thus the springs 310 bend in unison with movement of the movable arm 100. Providing the springs 310 facilitates the overcoming of friction forces within ball joints of the movable arm 100 which may facilitate more even bending, and more uniform and controlled movement of the movable arm 100. As will be appreciated by those skilled in the art, the coil springs 310 are made from a suitable resilient material such as, for example, steel. Also, instead of the illustrated plurality of coil springs 310, a single long spring, that extends the length (end-to-end) of the movable arm 100, may be employed in an alternative example embodiment.

Regarding the camera 130 at the movable end of the movable arm 100, it will be understood that some electronical processing of images taken by the camera 130 may be carried out depending on the position of the movable arm 100. For example, in the illustrated position the movable arm 100 is bent in one direction corresponding to greater shortening of the wire segment 162 relative to the wire segment 160. In such a position the image of the camera 130 is upright. Say though that the movable arm 100 is bent in an opposite direction corresponding to greater shortening of the wire segment 160 relative to the wire segment 162. In such a case the camera 130 will be oriented upside down, meaning that the image of the camera 130 will not be immediately upright. Thus electronic processing of images may ensure that the final received or stored image will be up right regardless of the orientation of the camera 130 which will vary as the movable arm 100 is moved around.

Figure 6:
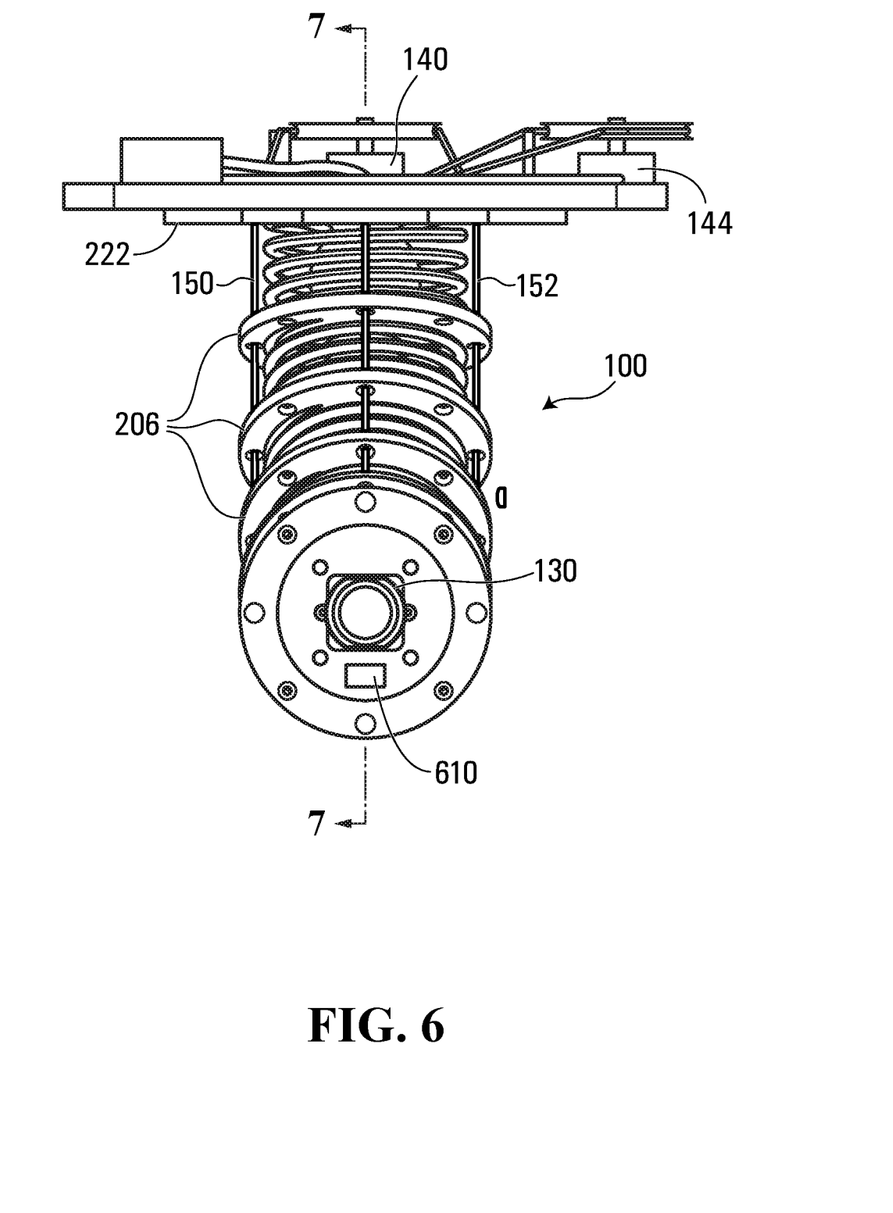
FIG. 6 illustrates a front elevational view of the movable arm of FIG. 1.
Figure 7:
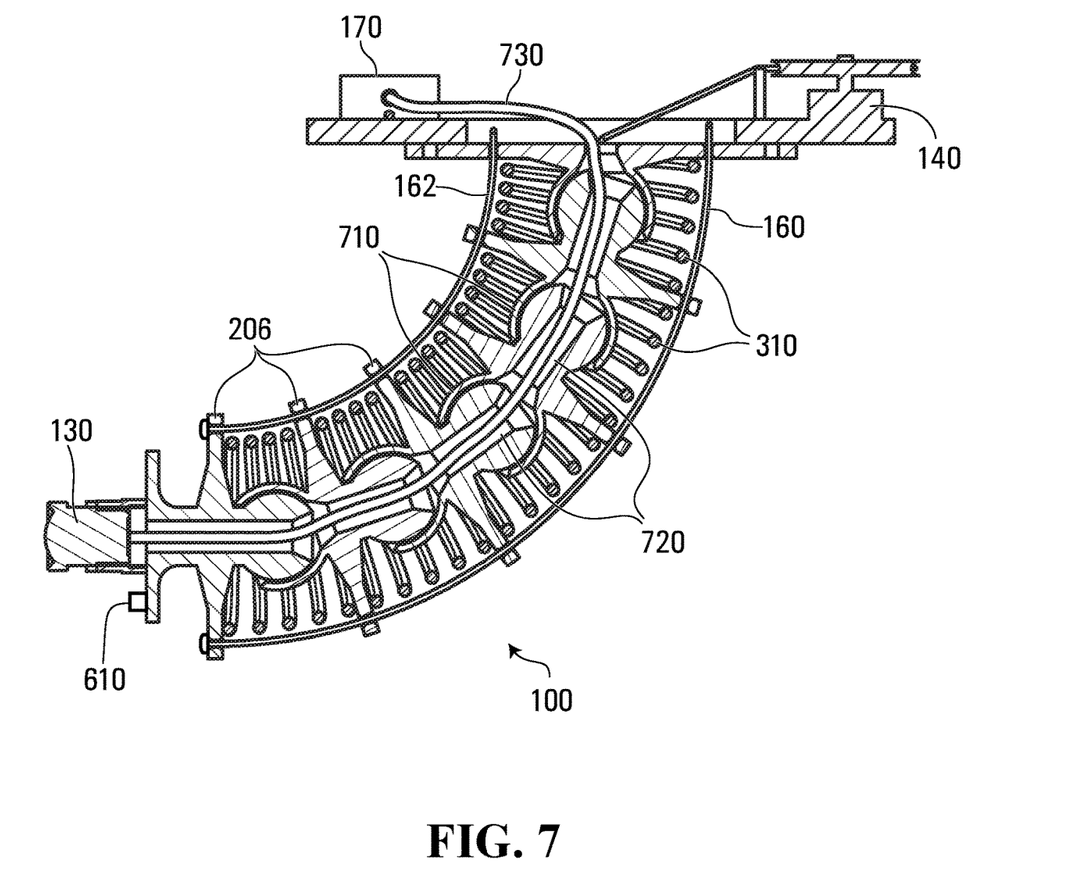
FIG. 7 illustrates a cross-sectional view of the movable arm of FIG. 1 taken along the line 7-7 in FIG. 6.

Reference will now be made to FIGS. 6 and 7. Starting with FIG. 7, this figure illustrates a cross-sectional view of the movable arm 100 taken along the line 7-7 in FIG. 6. As shown in this figure, each link of the movable arm 100 includes a ball joint 710, where adjacent ball joints 710 are spaced apart from each other by one of the discs 206. Regarding FIG. 6, this figure illustrates a front elevational view of the movable arm 100. Attached at the movable end of the movable arm 100, a gyroscope 610 is employed to measure the orientation of the camera, which can then be compared to the expected orientation in order to facilitate error compensation adjustment in terms of desired position versus actual position of the movable arm 100. This error compensation adjustment in relation to orientation of the camera will now be explained with reference to FIG. 8.

Figure 8:
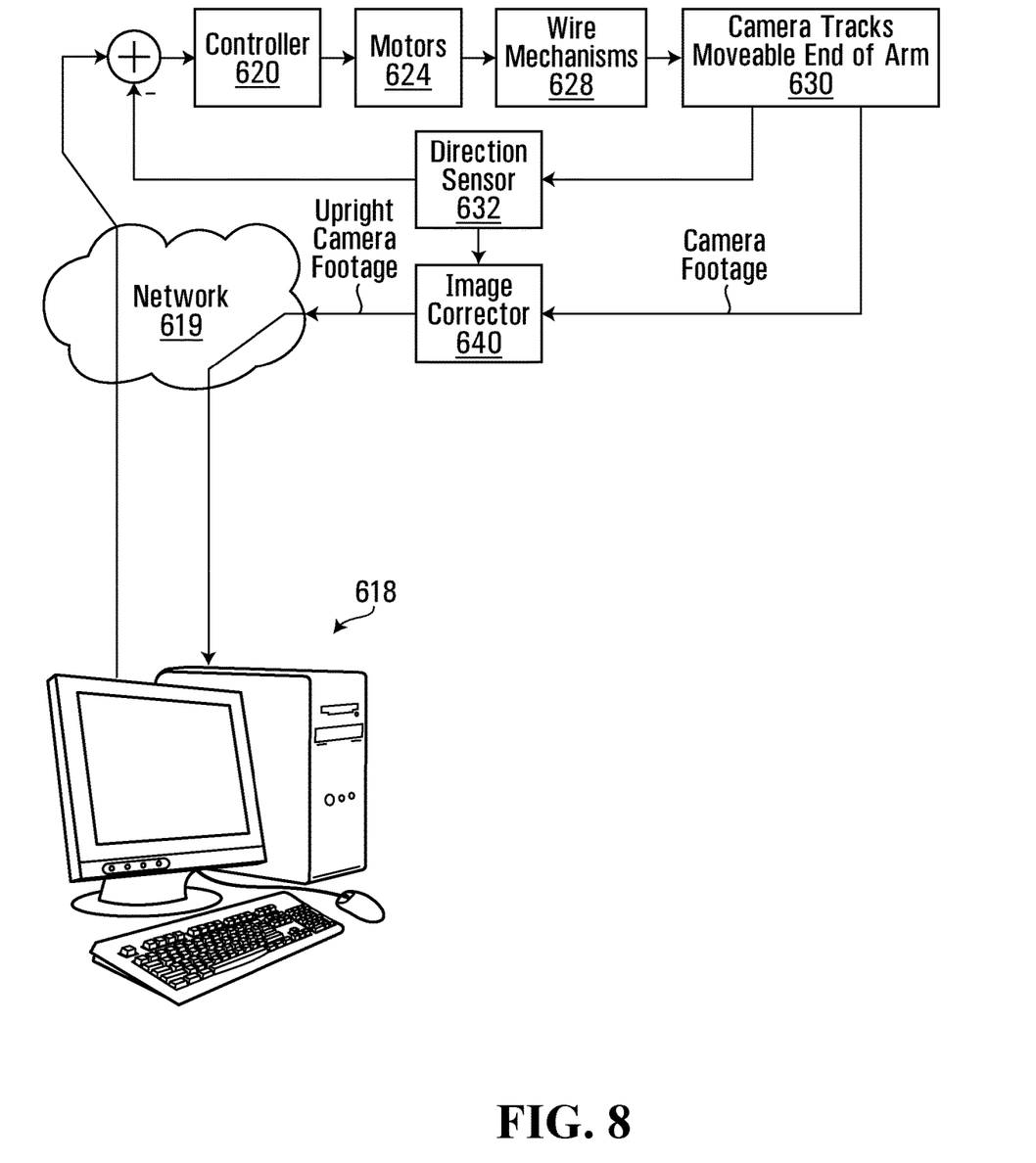
FIG. 8 illustrates a diagram of a control loop of an electronic movement-controlled system that includes a movable arm in accordance with example embodiments.

FIG. 8 illustrates a diagram of a control loop of an electronic movement-controlled system that includes a movable arm (such as, for example, the movable arm 100 or other movable arm herein described) in accordance with example embodiments. Starting at the bottom left corner of the diagram, a user terminal 618 is operated to communicate a desired direction of camera orientation (for example, as provided in a pan or tilt command) over a network 619 to a controller 620 (for example, a controller in the electronics enclosure 170). Based on a comparison of a desired direction of the camera against current direction in which the camera is pointed, the controller 620 determines what actuation of motors 624 (such as, for example, motors of the first and second assemblies 140 and 144) is needed. The motors 624 then in turn cause controlled displacement of wire mechanisms 628 (such as, for example, the pulleys of the first and second assemblies 140 and 144 and the respective wires on these pulleys). The wire mechanisms 628 in turn cause displacement of the movable arm as has been herein described. Next a camera (such as, for example, the camera 130) tracks the movable end of the arm (i.e. box 630 in the diagram). As the camera is displaced, a direction sensor 632 (such as, for example, the gyroscope 610) provides the feedback of the loop as shown. Also, the direction sensor output of the direction sensor 623 is input to an image corrector 640 which will correct upside down camera footage from the camera if the output of the direction sensor 632 indicates the camera is outputting upside down camera footage.

Figure 9A:
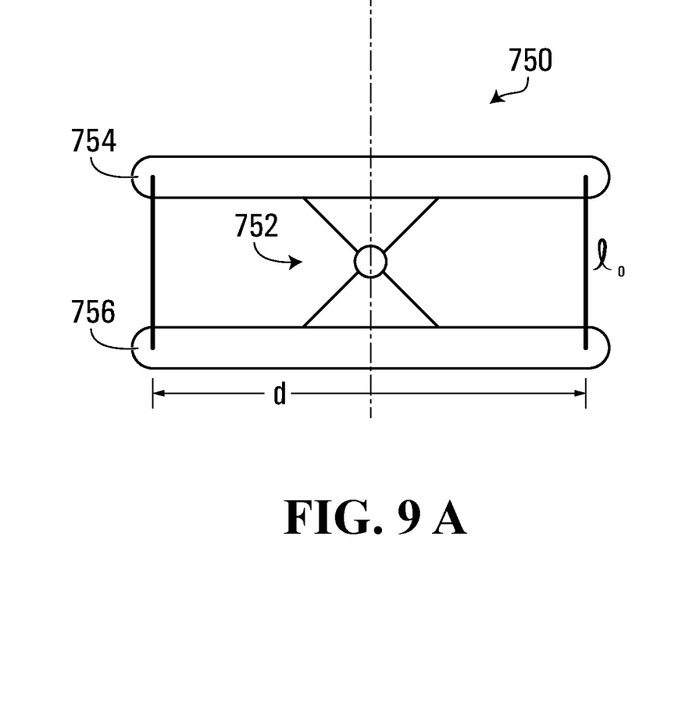
FIGS. 9A and 9B illustrate simplified diagrams of one of the links of the movable arm in accordance with example embodiments.
Figure 9B:
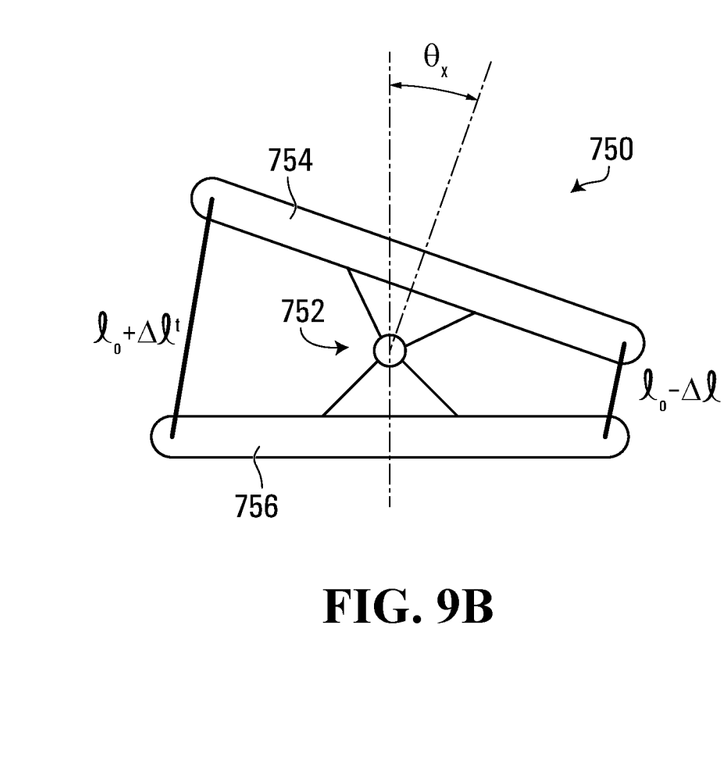
Figure 10:
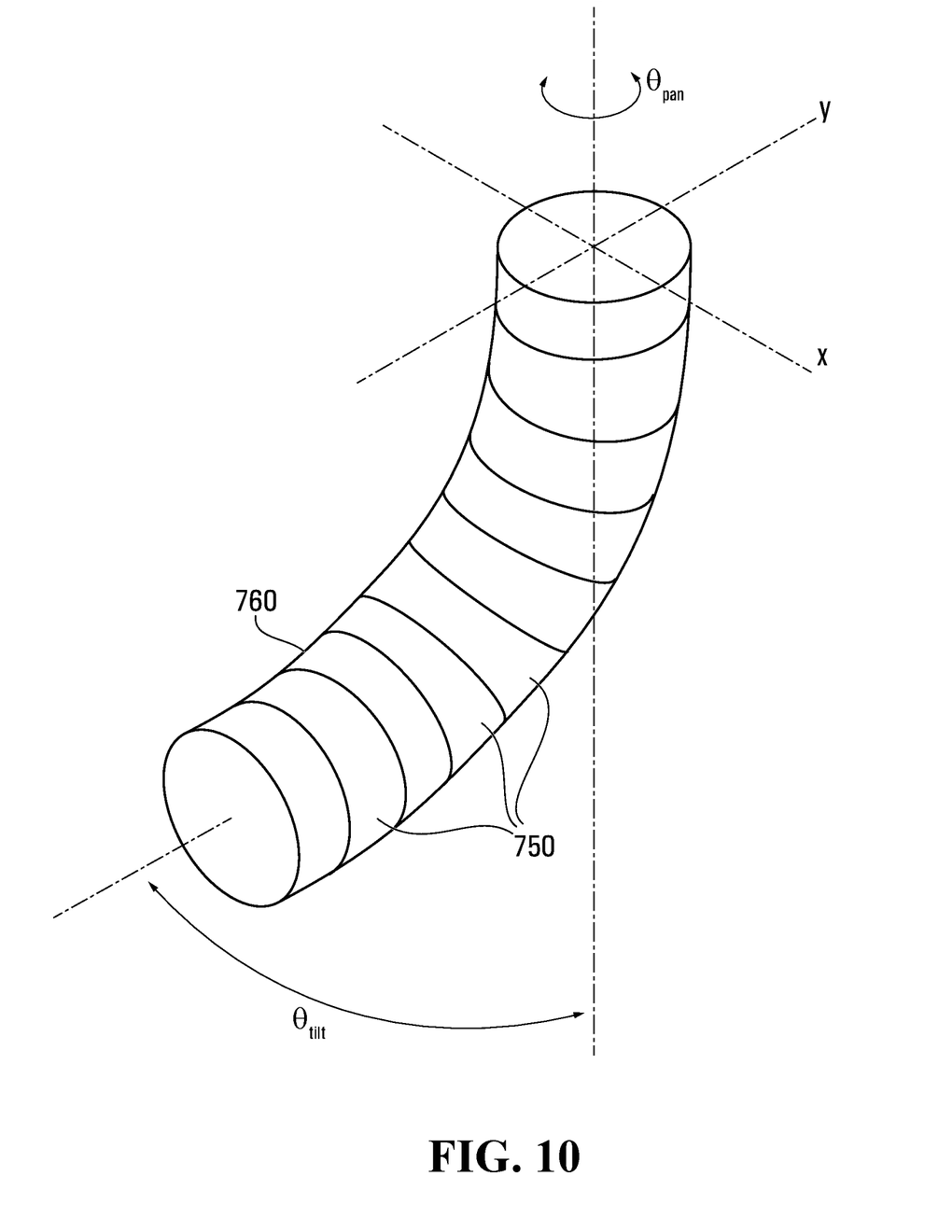
FIG. 10 illustrates a diagram showing how the movable arm can be seen to have both a pan angle and a tilt angle associated with its movement.

Reference will now be made to FIGS. 9A, 9B and 10. FIGS. 9A and 9B illustrate a simplified diagram of an individual link 750 of the movable arm. FIG. 10 illustrates a diagram showing how movable arm 760 (shown in simplified form without structural and component detail) can be seen to have both a pan angle and a tilt angle associated with its movement.

For each joint 752 between two plates 754 and 756, the un-bent length of the cables on either side of the joint is $l_0$. As the joint is bent to an angle $\theta_x$, the cable on one side of the joint is contracted by $\Delta l^-$, and the cable on the other side is expanded by $\Delta l^+$. Geometric analysis show that:

$$\Delta l^- = d \cdot \sin\left(\frac{\theta}{2}\right) - 2l_0 \cdot \sin^2\left(\frac{\theta}{4}\right) \tag{1}$$

-continued $$\Delta l^+ = d \cdot \sin\left(\frac{\theta}{2}\right) + 2l_0 \cdot \sin^2\left(\frac{\theta}{4}\right) \qquad (2)$$

The amount of expansion and contraction of the cables are different, and the difference δ is:

$$\delta = 4l_0 \cdot \sin^2\left(\frac{\theta}{4}\right) \qquad (3)$$

For small values of θ, this difference is also small. For example, if the joint bending angle is 5 degrees, the difference between cable expansion and contraction would be 0.2%. This difference amount can be ignored by choosing an elastic cable and pre-tensioning the cable during assembly.

The pan and tilt angle ($\theta_{pan}$, $\theta_{tilt}$) of the camera can be calculated based on the angular displacement ($\Phi_1$, $\Phi_2$) of the pulley motors 140 and 144 using the following equations (assuming the pulleys radius r, is same for each motor):

$$\theta_{pan} = \tan^{-1}\left(\frac{\Phi_1}{\Phi_2}\right) \qquad (4)$$

$$\theta_{tilt} = 2N \cdot \sin^{-1}\left(\frac{r}{2Nd}\sqrt{\Phi_1^2 + \Phi_2^2}\right) \qquad (5)$$

With reference once again to FIG. 7, it will be seen that each link defines a hollow channel 720. These hollow channels 720 are connected in series over the length of the movable arm 100, such that the movable arm 100 provides one long channel (i.e. made up of the smaller channels) over the length of the movable arm 100. This long channel allows wiring 730 to extend internally, end-to-end within the movable arm 100. The wiring 730 allows power to be delivered to the camera 130 in order to power it. Also, images and other data or information generated by the camera 130 may be delivered to the electronics enclosure via the wiring 730. In some examples, the camera 130 is capable of carrying out optical and/or digital zooming to complement the pan and tilt movement carried out by the movable arm 100. In such examples the entire electronic movement-controlled apparatus functions effectively as a PTZ camera. In other examples, the camera 130 may not include capability for optical and/or digital zooming.

Figure 11:
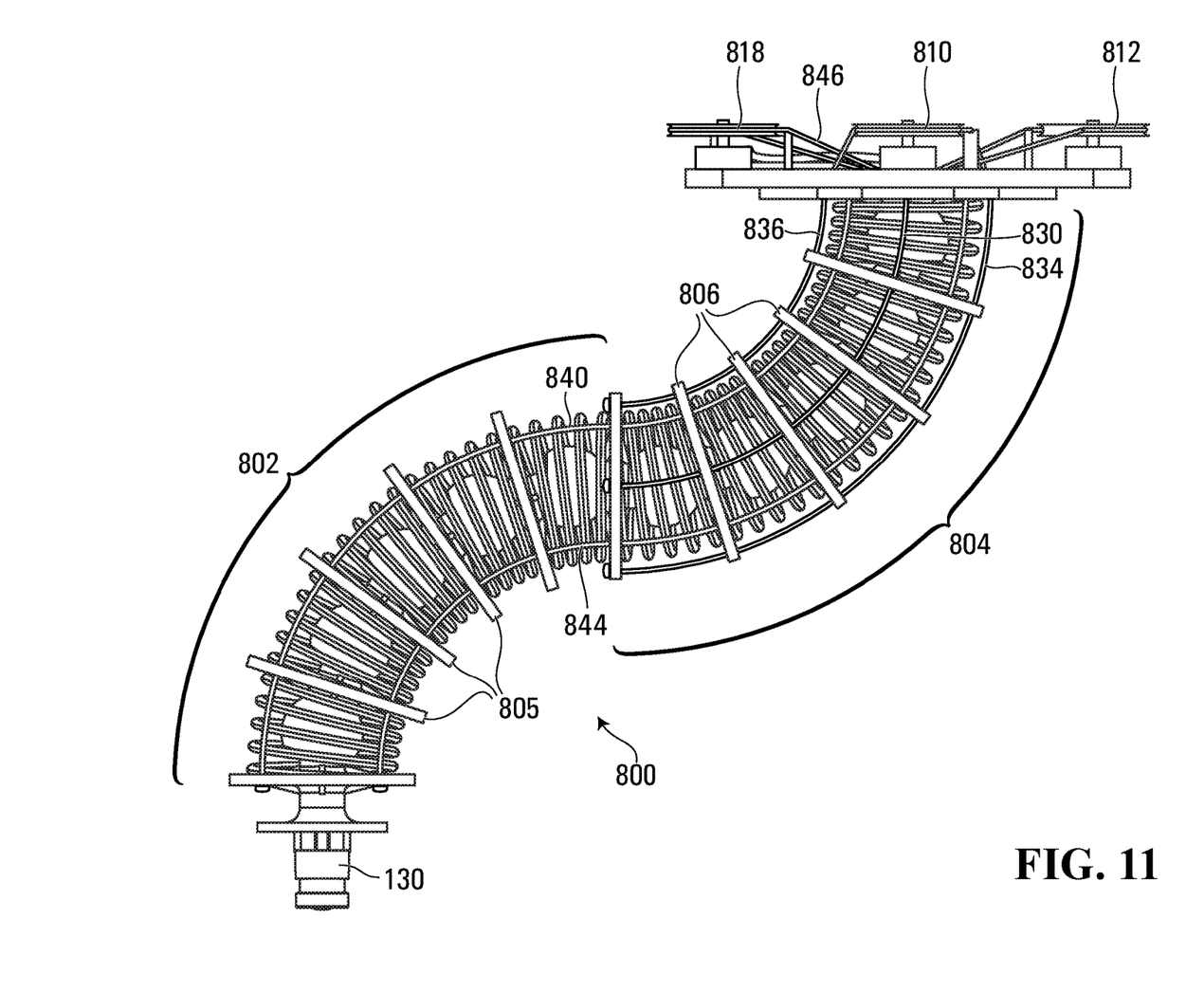
FIG. 11 illustrates a side elevational view of a movable arm in accordance with an alternative example embodiment.
Figure 12:
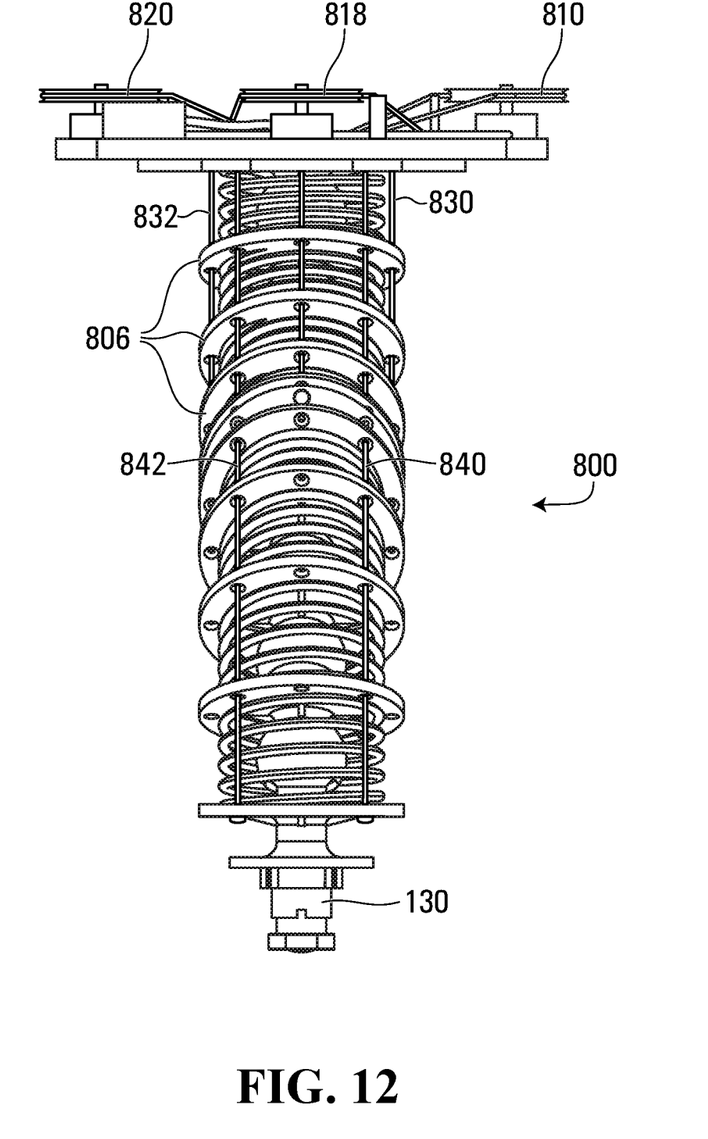
FIG. 12 illustrates a front elevational view of the movable arm of FIG. 11.

Other configurations and variations are contemplated, one example of which is shown in FIGS. 11 and 12. FIGS. 11 and 12 illustrate a movable arm 800 in accordance with an alternative example embodiment. The movable arm is comprised of two sections 802 and 804. The section 802 includes a subset of links having discs 805 at beginning ends of the links. The section 804 includes another subset of links having discs 806 at beginning ends of the links. Control of movement of the section 802 is not the same as control of movement of the section 804. Each of the sections 802 and 804 has its respective movement actuated by some or all of the pulleys and wire segments. With respect to the section 804, movement is controlled not only by actuation of the pulleys 810 and 812 and respective wire segments 830, 832, 834 and 836, it is also controlled by allowing freedom of movement of the wires on pulleys 818 and 820. With respect to the section 802, movement is controlled by a set of pulleys composed of the pulleys 818 and 820 and wire segments 840, 842, 844 and 846. Regarding the wire segments 830, 832, 834 and 836, it will be noted that these will be held taut during a bending change in the section 802 in order that expansion and contractions of the wire segments 840, 842, 844 and 846 only impacts movement of the section 802 (not the section 804).

The springs of the movable arm 800 can be the similar or the same as the coil springs 310 of the movable arm 100 of FIGS. 1-7. Again, instead of the illustrated plurality of springs, a single long spring that extends the length (end-to-end) of the movable arm 800 may be employed in an alternative example embodiment.

Certain adaptations and modifications of the described embodiments can be made. For example, the movable arm 100 herein illustrated is shown without any bubble covering the movable arm 100. In an alternative embodiment, the movable arm 100 and the camera 130 may be enclosed within a bubble. As those skilled in the art will appreciate, it is not uncommon for the typical camera unit of a PTZ camera to be enclosed within a bubble. As another example, although the movable arm 100 herein illustrated is shown as having a roughly tubular shape, other shapes are contemplated such as, for example, a rectangular prism shape, a diamond prism shape, etc.).

Therefore, the above discussed embodiments are considered to be illustrative and not restrictive, and the invention should be construed as limited only by the appended claims.

The invention claimed is:

1. An electronic movement-controlled apparatus comprising:
   a camera;
   an arm bending mechanism comprising wire segments;
   a movable arm coupled to the arm bending mechanism, the movable arm having both a stationary end and a movable end with the camera being attached to the movable end so as to be movable therewith, the stationary end being configured to be coupled to a rigid support structure, and the movable arm including a plurality of arm segments connected in series to form the movable arm, and the arm segments being configured to have cooperating segment regions in terms of each of the arm segments being compressible and expandable in unison under operation of the arm bending mechanism to move the movable end and effect a pan and tilt movement of the camera, wherein the wire segments extend along a length of the movable arm; and
   a controller configured to:
      receive a command to change a pointing direction of the camera to a desired pointing direction;
      in response to the command, map the desired pointing direction to a respective requisite position of the movable end of the movable arm; and
      cause the arm bending mechanism to change respective lengths of the wire segments and consequently bend the movable arm to effect movement of the movable end of the movable arm to the requisite position so that the camera points in the desired pointing direction.

2. The electronic movement-controlled apparatus as claimed in claim 1, wherein the camera is configured to receive a zoom command and change an optical zoom or digital zoom of the camera based on the zoom command.

3. The electronic movement-controlled apparatus as claimed in claim 1, wherein the apparatus functions effectively as a Pan-Tilt-Zoom (PTZ) camera by combination of pan and tilt movement capability provided by the movable arm and zoom capability of the camera attached to the movable end of the movable arm.

4. The electronic movement-controlled apparatus as claimed in claim 1, wherein the movable arm is comprised of at least two sections with a first section of the at least two sections including a first number of the plurality of arm segments and a second section of the at least two sections including a second number of the plurality of arm segments, control of movement of the first section is separate from control of movement of the second section.

5. The electronic movement-controlled apparatus as claimed in claim 1, wherein the rigid support structure includes a panel-type structure of a ceiling.

6. A video surveillance system with addressable devices which intercommunicate over a network, the video surveillance system comprising:
    a camera;
    an arm bending mechanism comprising wire segments;
    a computing device communicatively coupled to the camera, the computing device configured to transmit, over the network, a command to change a pointing direction of the camera to a desired pointing direction;
    a movable arm coupled to the arm bending mechanism, the movable arm having both a stationary end and a movable end with the camera being attached to the movable end so as to be movable therewith, the stationary end being configured to be coupled to a rigid support structure, and the movable arm including a plurality of arm segments connected in series to form the movable arm, and the arm segments being configured to have cooperating segment regions in terms of each of the arm segments being compressible and expandable in unison under operation of the arm bending mechanism to move the movable end and effect a pan and tilt movement of the camera, wherein the wire segments extend along a length of the movable arm; and
    a controller configured to:
        receive the command from the computing device;
        in response to the command, map the desired pointing direction to a respective requisite position of the movable end of the movable arm; and
        cause the arm bending mechanism to change respective lengths of the wire segments and consequently bend the movable arm to effect movement of the movable end of the movable arm to the requisite position so that the camera points in the desired pointing direction.

7. The video surveillance system as claimed in claim 6, wherein the camera is configured to receive a zoom command and change an optical zoom or digital zoom of the camera based on the zoom command.

8. The video surveillance system as claimed in claim 6, wherein the movable arm and camera together function effectively as a Pan-Tilt-Zoom (PTZ) camera by combination of pan and tilt movement capability provided by the movable arm and zoom capability of the camera attached to the movable end of the movable arm.

9. The video surveillance system as claimed in claim 6, wherein the movable arm is comprised of at least two sections with a first section of the at least two sections including a first number of the plurality of arm segments and a second section of the at least two sections including a second number of the plurality of arm segments, and control of movement of the first section is separate from control of movement of the second section.

10. The video surveillance system as claimed in claim 6, wherein the rigid support structure includes a panel-type structure of a ceiling.

11. A method of panning and tilting a camera attached to a first end of an electronically-controlled, movable arm, the movable arm comprising wire segments extending therealong and having both the first end and a second end which are a movable end and a stationary end respectively, and the method comprising:
    receiving a command to change a pointing direction of the camera to a desired pointing direction;
    in response to the command, mapping the desired pointing direction to a respective requisite position of the movable end of the movable arm; and
    changing respective lengths of the wire segments and consequently causing the movable arm to move the movable end to the requisite position so that the camera points in the desired pointing direction.

12. The electronic movement-controlled apparatus as claimed in claim 1, wherein the movable arm comprises discs spaced along the length of the movable arm, and wherein each of the discs comprises holes through which the wire segments respectively extend.

13. The electronic movement-controlled apparatus as claimed in claim 1, wherein the arm bending mechanism comprises at least one pulley and motor assembly used to control the lengths of at least one pair of the wire segments.

14. The electronic movement-controlled apparatus as claimed in claim 13, wherein the at least one pulley and motor assembly comprises a first pulley and motor assembly and a second pulley and motor assembly, the at least one pair of the wire segments comprises a first pair of the wire segments and a second pair of the wire segments, and the first and second pulley and motor assemblies respectively control the lengths of the first and second pairs of the wire segments.

15. The electronic movement-controlled apparatus as claimed in claim 14, wherein the first pair of wire segments are spaced 180 degrees apart on the movable arm, the second pair of wire segments are spaced 180 degrees apart on the movable arm, and spacing between any two of the wire segments that are adjacent is 45 degrees.

16. The electronic movement-controlled apparatus as claimed in claim 1, wherein the plurality of arm segments only move in unison.

17. The electronic movement-controlled apparatus as claimed in claim 16, wherein the wire segments comprise a single wire attached along the length of the movable arm such that changing the respective lengths of the wire segments causes the plurality of arm segments to only move in unison.

18. The video surveillance system as claimed in claim 6, wherein the movable arm comprises discs spaced along the length of the movable arm, and wherein each of the discs comprises holes through which the wire segments respectively extend.

19. The video surveillance system as claimed in claim 6, wherein the arm bending mechanism comprises at least one pulley and motor assembly used to control the lengths of at least one pair of the wire segments.

20. The video surveillance system as claimed in claim 19, wherein the at least one pulley and motor assembly comprises a first pulley and motor assembly and a second pulley and motor assembly, the at least one pair of the wire segments comprises a first pair of the wire segments and a second pair of the wire segments, and the first and second pulley and motor assemblies respectively control the lengths of the first and second pairs of the wire segments.

21. The video surveillance system as claimed in claim 20, wherein the first pair of wire segments are spaced 180 degrees apart on the movable arm, the second pair of wire segments are spaced 180 degrees apart on the movable arm, and spacing between any two of the wire segments that are adjacent is 45 degrees.

22. The video surveillance system as claimed in claim 6, wherein the plurality of arm segments only move in unison.

23. The video surveillance system as claimed in claim 22, wherein the wire segments comprise a single wire attached along the length of the movable arm such that changing the respective lengths of the wire segments causes the plurality of arm segments to only move in unison.

24. The method as claimed in claim 11, wherein the movable arm comprises a plurality of arm segments connected in series to form the movable arm, and wherein the plurality of arm segments only move in unison.

25. The method as claimed in claim 24, wherein the wire segments comprise a single wire attached along a length of the movable arm such that changing the respective lengths of the wire segments causes the plurality of arm segments to only move in unison.

\* \* \* \* \*